US00RE35736E

United States Patent [19]

Powell

[11] E Patent Number: Re. 35,736

[45] Reissued Date of Patent: Feb. 24, 1998

[54] DISTRIBUTED ANTENNA SYSTEM

[75] Inventor: Alan J. Powell, Seal Farnham, England

[73] Assignee: Allen Telecom Group, Inc., Solon, Ohio

[21] Appl. No.: 344,534

[22] Filed: Nov. 23, 1994

Related U.S. Patent Documents

Reissue of:

[64] Patent No.: 4,916,460
Issued: Apr. 10, 1990
Appl. No.: 250,928
Filed: Sep. 29, 1988

U.S. Applications:

[63] Continuation of Ser. No. 865,325, Apr. 8, 1992, abandoned.

[30] Foreign Application Priority Data

Jan. 29, 1988 [GB] United Kingdom ..... 8801975

[51] Int. Cl.[6] ..... H01Q 21/00; H04B 9/00

[52] U.S. Cl. ..... 343/853; 359/145

[58] Field of Search ..... 343/711, 853; 359/145, 146; H01Q 21/00

[56] References Cited

U.S. PATENT DOCUMENTS

| | | | |
|---|---|---|---|
| 1,985,241 | 12/1934 | Daya | 343/711 |
| 4,456,793 | 6/1984 | Baker et al. | 359/145 |
| 4,596,051 | 6/1986 | Feldman | 359/145 |
| 4,736,463 | 4/1988 | Chavez | 359/145 |

FOREIGN PATENT DOCUMENTS

| | | | |
|---|---|---|---|
| 3135231 | 4/1983 | Germany | 359/145 |
| 1439399 | 6/1976 | United Kingdom . | |
| 1546604 | 5/1979 | United Kingdom . | |
| 2177572 | 1/1987 | United Kingdom . | |

OTHER PUBLICATIONS

Umechi et al. "Optical Fiber Transmission For Separate Receiving System of TV Translators," NTC 78 Conference Record of the IEEE 1978 National Telecomm. Conf., Birmingham, Ala, USA, 3–6 Dec. 1978, pp. 5.6.1 to 5.6.5.

IEE Proceedings, vol. 132, Pt. F., No. 5, Aug. 1985, entitled "Towards a High–Capacity Digital Cellular Mobile Radio System".

*Primary Examiner*—Michael C. Wimer
*Attorney, Agent, or Firm*—Sidley & Austin

[57] ABSTRACT

The present invention provides a distributed antenna system comprising a primary antenna (14A, 16A) and a plurality of secondary antennas (36, 40), a [fibre] *fiber* optic network (20, 22) connected between the primary antenna (14A, 16A) and the secondary antennas (36, 40), first means ([16] *24*, 44) associated with a first one of the antennas (16A, 40) which transmits signals received by that antenna (16A, 40) into the [fibre] *fiber* optic network (20, 22), and second means (32, 50) associated with a second one of the antennas (14A, 36) which causes that antenna (14A, 36) to transmit signals received by the second means (32, 50) from the [fibre] *fiber* optic network (20, 22). Preferably, the use of a heterodyne circuit is avoided and the light signals travelling within the [fibre] *fiber* optic networks (20, 22) are modulated at radio frequency.

17 Claims, 2 Drawing Sheets

DISTRIBUTED ANTENNA SYSTEM

Matter enclosed in heavy brackets [ ] appears in the original patent but forms no part of this reissue specification; matter printed in italics indicates the additions made by reissue.

*RELATED APPLICATION*

*This is a continuation of U.S. patent appl. Ser. No. 07/865,325 filed Apr. 8, 1992 abandoned.*

The present invention relates to a distributed antenna system.

BACKGROUND OF THE INVENTION

It is well known that the transmission and reception electromagnetic radiation at frequencies such as radio frequencies is severely impaired by any significant mass of solid material such as the walls of a building or the ground above a tunnel. The inability to transmit and/or receive radio signals within a tunnel or from one part of a building to another can be a severe disadvantage.

In order to mitigate the described disadvantage, it has previously been proposed to establish a distributed antenna system, which system is sometimes referred to as a "leaky feeder". This comprises the provision of a co-axial cable with holes in the shielding of the cable at strategic locations whereby a radio frequency signal injected into the cable "leaks out" at the strategically placed holes. This arrangement does, to some extent, mitigate the above [dscribed] *described* disadvantage. However, attenuation of the radio frequency signal within the cable is severe and typically a repeater may be required at 100 yard intervals with a maximum practical length of cable being about 1 mile. Beyond this distance, it is extremely difficult to distinguish the original signal from the background noise, despite the use of the repeaters. It will be appreciated that a relatively high power signal is used and consequently the co-axial cable must have relatively high power specifications, which inevitably result in a relatively high expense. The "leaky feeder" co-axial system is not appropriate for use with the radio signals at the frequencies used for cellular radio telephone systems.

SUMMARY OF THE INVENTION

With a view to providing an improved system, the present invention provides a distributed antenna system comprising a primary antenna and a plurality of secondary antennas, a fiber optic network connected between the primary antenna and the secondary antennas, first means associated with a first one of the antennas which transmits signals received by that antenna into the fiber optic network, and second means associated with a second one of the antennas which causes that antenna to transmit signals received by the second means from the fiber optic network.

In one embodiment, the first antenna is the primary antenna and each of the secondary antennas is provided with a respective one of said second means. In another embodiment, the second antenna is the primary antenna and each of said secondary antennas is provided with a respective one of said first means. More preferably, an embodiment of the invention provides a distributed antenna system in which both the aforementioned arrangements are provided. That is, the system provides for distributed transmission and distributed reception.

Most beneficially, the signal transmitted into the fiber optic network comprises direct radio frequency modulation of the output of a laser.

BRIEF DESCRIPTION OF THE DRAWINGS

Embodiments of the present invention will now be described by way of example only and with reference to the accompanying drawings, in which.

DETAILED DESCRIPTION

Figure 1:
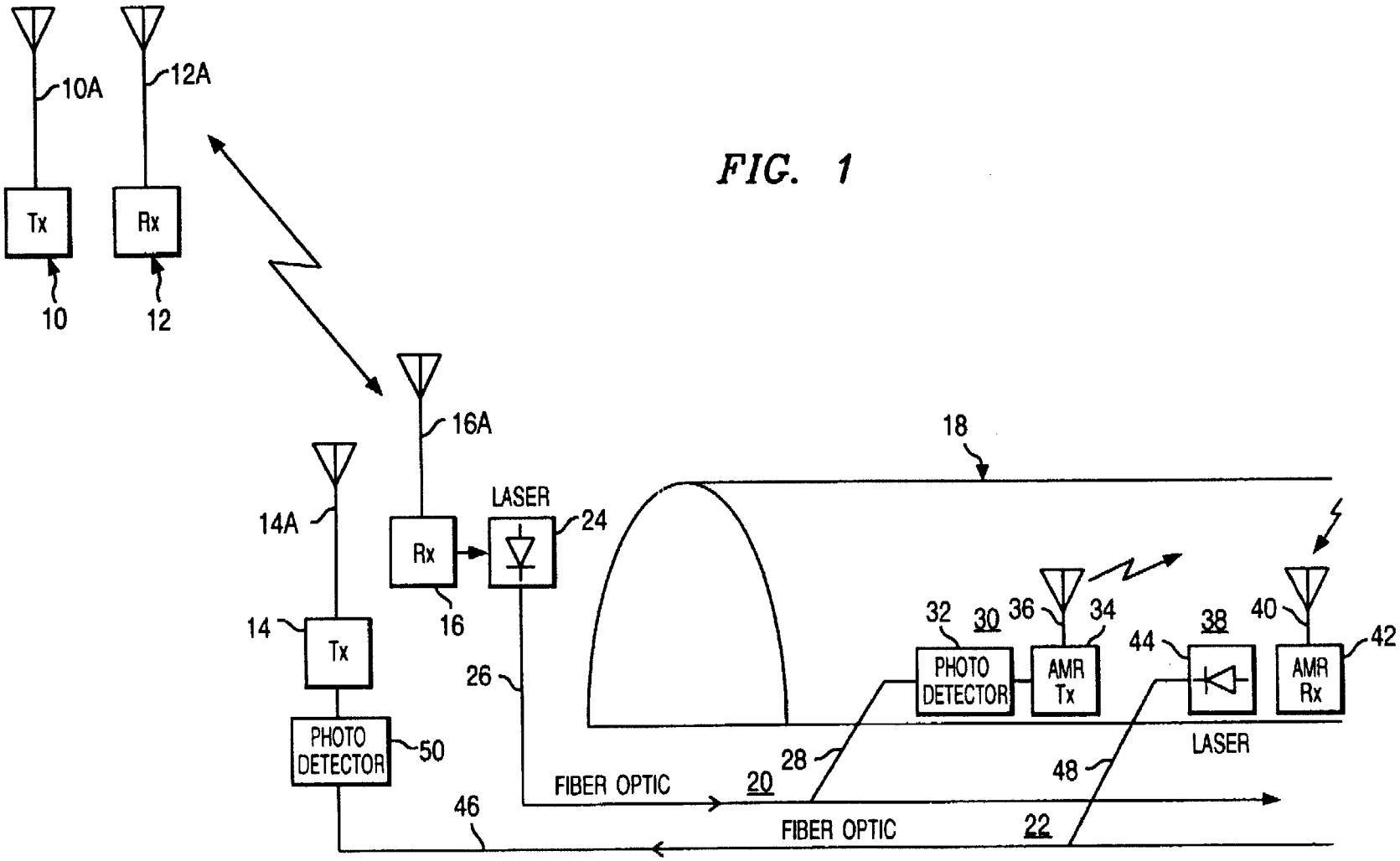
FIG. 1 is a schematic diagram illustrating an embodiment which provides for both distributed transmission and distributed reception.

A preferred embodiment of the invention is illustrated schematically in FIG. 1. A conventional radio transmission and reception system is indicated by units 10–16, each of which has an associated antenna, 10A–16A. Units 10 and 12 are respectively a transmitter and a receiver established at a first location. Units 14 and 16 are respectively a transmitter and a receiver established at a second location. Two way radio communication between the first and second locations takes place in a purely conventional manner, as is to be found in any free space radio link. However, units 14 and 16 act as the input and output of a distributed antenna system.

In the example illustrated in FIG. 1, it is desired to provide a full free space radio transmission and reception system within a tunnel. The tunnel is indicated by reference numeral 18. One circuit, 20, provides distributed transmission of a radio signal within the tunnel and another circuit 22, provides for the distributed reception of radio signals from within the tunnel. Of course, in practice, there may only be a requirement for either distributed reception or distributed transmission, in which case only one of the circuits 20 and 22 would be provided. However, the illustrated two circuit arrangement may be desirable, for example if the aim is to provide cellular radio telephone facilities within the tunnel.

Each circuit 20 and 22 comprises a primary antenna and a plurality of secondary antennas, with the primary antenna being connected to the secondary antennas via a fiber optic network. In the case of circuit 20 (FIG. 2), the receiver units 16 associated with primary antenna 16A provides control signals to modulate the output of a laser 24. Laser 24 transmits light signals into fiber optic network 26 which has network branches 28 which feed respective secondary antenna systems 30. The secondary antenna system 30 comprises a photo detector 32 which receives light signals from fiber optic branch 28, and a transmitter amplifier 34. Amplifier 34 receives electrical signals from the photo detector 32 and supplies signals to secondary antenna 36, whereby the original radio frequency signal is re-transmitted within the tunnel. A number of secondary antenna units 30 may be spaced along the length of the tunnel, effectively providing local "drop off" nodes for the radio frequency signal.

Circuit 22 (FIG. 3) is of similar configuration except for the fact that the signals travel in the opposite direction. That is, each secondary antenna unit 38 comprises a secondary antenna 40 which receives radio frequency signals from within the tunnel and supplies these to a receiver amplifier unit 42 which uses the received signals to control the output of a laser 44. Laser 44 transmits light signals into the fiber optic network 46 via a fiber optic network branch 48. A photo detector 50, filter 56 and power amplifier 58 are associated with primary antenna 14A and transmitter 14.

That is, photo detector 50 receives light signals from fiber optic network 46 and supplies transmitter 14 with radio frequency electrical signals which are used to cause primary antenna 14A to re-transmit the radio signals. A plurality of secondary antenna units 38 may be provided along the length of the tunnel.

The [laser] *lasers* employed in the illustrated arrangement are of conventional construction. These lasers are, however, of the so-called "linear" type and operate in an analog rather than a digital mode. The components used for the various transmitter and receiver units are also conventional. More detail of these units is given with reference to FIGS. 2 and 3. It is to be noted that in the arrangement described with reference to FIG. 1, the light signals travelling within the fiber optic networks are modulated at radio frequencies. The only conversion is between electrical and light signals. No heterodyne circuit is used.

Figure 2:
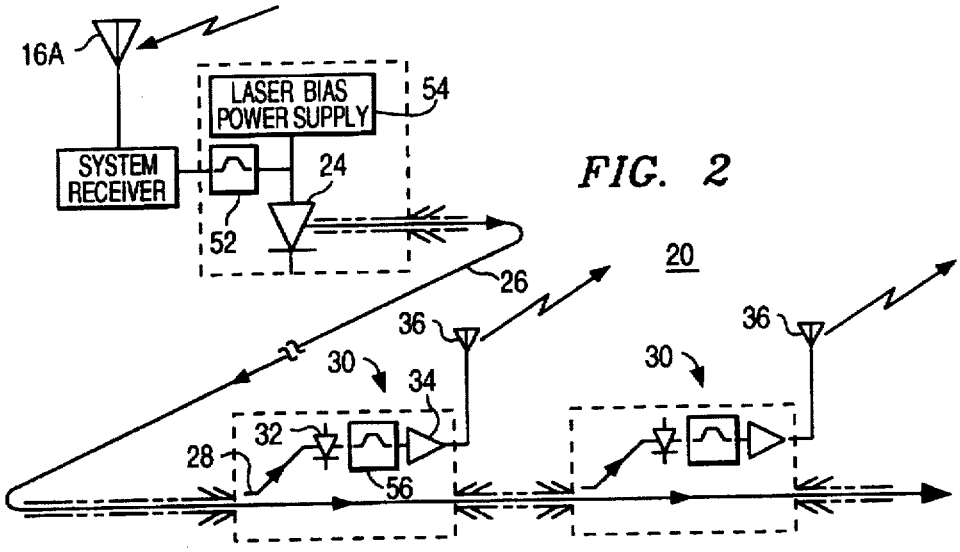
FIG. 2 is a more detailed block diagram illustrating the reception and distributed transmission system of FIG. 1.
Figure 3:
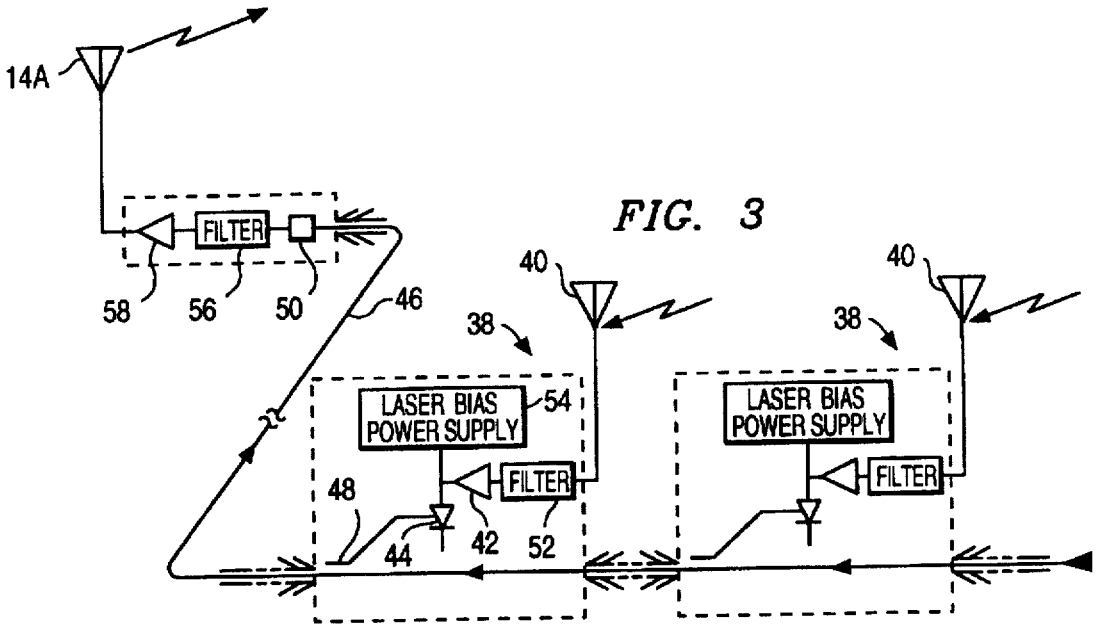
FIG. 3 is a more detailed block diagram illustrating the distributed reception and central re-transmission system shown in FIG. 1.

FIGS. 2 and 3 illustrate in more detail the respective circuits 20 and 22 shown in FIG. 1. That is, FIG. 2 shows the [detail] *details* of a circuit suitable for a 'Base to Mobile' distribution antenna system, whereas FIG. 3 shows the [detail] *details* of a circuit suitable for a "Mobile to Base" distributed antenna system. As stated above, it is expected that the two circuits will usually be used together, although each could be used separately as the circumstances [requires] *require*. Essentially, FIGS. 2 and 3 [shown] *show* that the radio frequency to fiber optic converters and fiber optic to radio frequency converters comprise conventional components. Specifically, the radio frequency to fiber optic converters comprise a filter 52, a laser power supply circuit 54, and the laser itself 24 and 44. The fiber optic to radio frequency [to fiber optic] converters comprise a photo detector [30] *32 and 50*, a filter 56 and an amplifier *34 and* 58. The design of these components is within the skill of the person skilled in the art and consequently will not be described herein.

In comparison, with the co-axial cable used in the known "leaky feeder" system, a suitable fiber optic network could be established at a very significantly reduced cost, perhaps as high as an 80% saving. Propagation of light signals within the fiber optic network, as is commonly known, [are] *is* subject to remarkably little attenuation. It is considered possible for a signal to be transmitted in the fiber optic network over a distance of about 30 miles before it is necessary to introduce a repeater. This is a very striking contrast with the above described use of repeaters in the co-axial system and may well be of profound significance for many modern vehicle tunnels. The fiber optic network is, of course, physically very flexible and easily conforms to the configuration required by the structure within which it is located. Signals travelling within the fiber optic network are unaffected by radio frequency interference and thus the network may be located adjacent power cables, which is not possible with the conventional co-axial system. Moreover, the bandwidth of the fiber optic network is considerably better than that of a co-axial system. The fiber optic bandwidth can cover essentially all radio frequencies and in particular those used by the cellular radio telephone system.

In particular, the receiver units and respective lasers comprise a linear analog system. That is, the laser [38] *44* (FIG. 3) is modulated in its linear region of operation. Specifically, the receiver units modulate the radio frequency on the DC power supply of the laser. This results in radio frequency baseband signals being transmitted in the form of light waves. Typically, the radio frequencies used with the above described embodiment might be in the range 100 MHz to 1 GHz.

For use in the described tunnel system, the power of the signal transmitted at each secondary antenna 36 may be of the order of a few milliwatts. In a conventional system using a "leaky feeder" co-axial system or an injection aerial located at the entrance to the tunnel, the power of the transmitted signal would typically be of the order of tens of watts and the maximum penetration into the tunnel will be significantly less than can be achieved with the described fiber optic network system. It is to be noted that the fiber optic network may take any suitable form whether tree-like or linear.

One application of the present invention, namely use in tunnels, has been described. However, it will be readily apparent to those skilled in the art that the present invention has numerous applications. As a further example, the system is particularly useful within buildings, especially larger office accommodation and hospitals or the like. Such application of the invention is particularly beneficial in combination with cordless telephone systems and cellular radio telephones. With use of the present invention, it may be feasible to locate a radio telephone "cell" within a single building.

What is claimed is:

1. A distributed antenna system comprising:

a primary antenna means for receiving modulated RF carrier signals from a remotely positioned radio frequency antenna means;

a circuit means including a first means connected to the primary antenna means for converting the modulated RF carrier signals to corresponding modulated light signals, an optic fiber network means having a first end and a plurality of second ends, the first end being connected to the first means for receiving and transporting the modulated light signals to the plurality of second ends, a plurality of second means connected to the plurality of second ends for receiving the modulated light signals and outputting corresponding modulated RF carrier signals, and a corresponding plurality of secondary antenna means connected to the plurality of second means *each* for receiving and transmitting *all* the corresponding modulated RF carrier signals, wherein modulated RF carrier signals are received by the first means of the circuit *means* for conversion to light modulated signals for transport through a radio frequency interference environment location by the optic fiber network *means* and conversion back to modulated RF carrier signals by the second means for transmission by *all* the plurality of secondary antenna means.

2. A distributed antenna system according to claim 1 wherein the primary antenna means includes a receiver means for producing modulated control signals and said circuit first means includes a laser means connected to the receiver means for receiving the modulating control signals and outputting modulated light signals through the [fiber] optic *fiber* network *means*, and said plurality of the [circuits] *circuit* second means including a plurality of photodetector means for receiving the modulated light signals and outputting modulated RF carrier signals to the plurality of secondary [antennas] *antenna means* for transmission.

3. A distributed antenna system comprising:

a primary antenna means for transmitting modulated RF carrier signals to a remotely positioned radio frequency antenna means; and a circuit means including: a first means connected to the primary antenna means for converting modulated light carrier signals to modulated RF carrier signals for transmission by the primary antenna means to the remotely positioned radio frequency antenna means, a fiber optic network means having a first end and a plurality of second ends in communication with the first end, *wherein all optical signals input into each of the second ends of the fiber optic network means are combined optically into a composite optical signal communicated to the first means,* said first end being connected to the first means for inputting modulated light signals received from the plurality of second ends into the first means for conversion *of the composite optical signal* to modulated RF carrier signals, a plurality of second means for converting modulated RF carrier signals into modulated light signals, said plurality of second means being connected to the plurality of second ends for inputting the modulated light signals into the fiber optic network *means*, and a plurality of secondary antenna means for receiving RF modulated carrier signals, said plurality of secondary antenna means being connected to the plurality of second means for inputting any received modulated RF carrier signals.

4. A distributed antenna system according to claim 3 wherein the plurality of second means for converting modulated RF carrier signals into modulated light signals includes a plurality of receiver amplifier means, for receiving the modulated RF carrier signals and producing control signals, and a plurality of laser means connected to the plurality of receiver amplifier means for receiving the control signals and outputting modulated light signals for the fiber optic network means and the circuit first means connected to the primary antenna means including a photodetector means connected to the fiber optic network means for receiving the *composite* modulated light signals and outputting corresponding modulated RF carrier signals for transmission by the primary antenna means to a remotely positioned antenna means.

5. A distributed antenna system comprising:

a first primary antenna means for receiving modulated RF carrier signals from a remotely positioned transmitter;

a first plurality of secondary antenna means for transmitting modulated RF carrier signals; and a *first* circuit means interconnecting the *first* primary antenna means to the plurality of secondary antenna means, said *first* circuit means including: a first means connected to the first primary antenna means for receiving the modulated RF carrier signals and outputting corresponding modulated light signals, a fiber optic network having a first end connected to the first means for receiving the modulated light signals and a plurality of second ends *each* for outputting *therefrom all* the modulated light signals *input into the first end*, a plurality of second means connected to the plurality of second ends for receiving the modulated light signals and outputting corresponding modulated RF carrier signals to the first plurality of secondary antenna means, *whereby each secondary antenna means transmits all the modulated RF carrier signals that correspond to the modulated light signals input into the first end of the fiber optic network*; and a second primary antenna means for transmitting modulated RF carrier signals to a remotely positioned [transmitter.] *receiver;* a second plurality of *secondary* antenna means for receiving modulated RF carrier signals[.]; and a *second* circuit means interconnecting the second primary antenna *means* to the second plurality of secondary antenna means, said *second* circuit means including a plurality of first means connected to the second plurality of *secondary* antenna means for receiving and converting modulated RF carrier signals to corresponding modulated light signals, a fiber optic network having a plurality of first ends connected to the plurality of first means *of the second circuit means* for receiving the modulated light signals and a second end for outputting the modulated light signals, and a second means *of the second circuit means* connected to the second end for receiving and converting the modulated light signals to corresponding modulated RF carrier signals, said second primary antenna means being connected to the second means *of the second circuit means* for receiving and transmitting the modulated RF carrier signals to [a] *the* remotely positioned [radio antenna means,] *receiver;* wherein two-way modulated RF carrier signals are converted to modulated light signals for transport by the fiber optic networks through a location containing an RF interference environment and re-converted to modulated RF carrier signals for re-transmission whereby two-way radio communication is provided [on each side of] *in* the location containing the RF interference environment.

6. A distributed antenna system comprising:

a primary antenna means for either receiving or transmitting modulated RF carrier signals, respectively, to or from a remotely positioned radio antenna means;

a plurality of secondary antenna means for either transmitting or receiving modulated RF carrier signals; [and]

a circuit means interconnecting the primary antenna means to the plurality of secondary antenna means, said circuit means including a first subcircuit having a first means connected to the primary antenna means for converting received modulated RF carrier signals into modulated light carrier signals, a fiber optic network having a first end connected to the first means for transporting *all* the modulated light carrier signals *input into the first end* to *each end of* a plurality of second ends of the [filter] *fiber* optic network, and a plurality of second means connected to the plurality of second ends for receiving and converting the modulated light carrier signals to modulated RF carrier signals for transmission by the plurality of secondary antenna means, *whereby all said secondary antenna means transmit RF carrier signals corresponding to the modulated light carrier signals input to the first end of the fiber optic network*; and a second sub-circuit having a plurality of first means connected to the plurality of [second] *secondary* antenna means for receiving and converting modulated RF carrier signals to modulated light carrier signals, a fiber optic network having a plurality of ends connected to the plurality of first means for transporting the modulated light carrier signals to an end opposite the plurality of ends, and a second means connected to the end opposite the plurality of ends of the fiber optic network for receiving and converting the modulated light signals into modulated RF carrier signals for transmission by the primary antenna *means*, wherein two-way modulated RF carrier signals are converted to modulated light carrier signals for transport through a radio frequency interference environment location for conversion back to modulated RF carrier signals for transmission.

*7. A distributed antenna transmission system for transmitting RF signals in a radio frequency interference environment, comprising:*

*a primary receiver for receiving RF signals from a remotely located radio frequency transmitter;*

*a receiver converter connected to the primary receiver for converting the RF signals to corresponding light signals;*

*a fiber optic network for use in said radio frequency interference environment, and having a first end and a plurality of second ends, the first end of the fiber optic network being connected to the receiver converter for receiving and transferring all the light signals input thereto to each end of the plurality of second ends of the fiber optic network,*

*a plurality of transmitter converters, each transmitter converter connected to a respective second end of the fiber optic network for receiving the light signals and for converting the light signals to corresponding RF signals;*

*a transmitter connected to each transmitter converter for transmitting RF signals; and*

*an antenna associated with each said transmitter for transmitting the RF signals, whereby RF signals are received by the receiver converter for conversion to corresponding light signals for transfer through a radio frequency interference environment by the fiber optic network, and for conversion back to corresponding RF signals by the transmitter converter for transmission by the plurality of antennas.*

*8. A distributed antenna transmission system according to claim 7 wherein the primary receiver includes means for producing control signals, and said receiver converter includes a laser connected to the primary receiver for receiving the control signals and outputting corresponding light signals through the fiber optic network, and each said transmitter converter includes a photodetector for receiving the light control signals and outputting RF signals to a respective said antenna for transmission thereof.*

*9. A distributed antenna receiving system for receiving RF signals in a radio frequency interference environment, comprising:*

*a primary transmitter for transmitting RF signals to a remotely located radio frequency receiver;*

*a transmitter converter connected to the primary transmitter, and having a single optical input for converting light signals to corresponding RF signals for transmission by the primary transmitter to the remotely located radio frequency receiver;*

*a fiber optic network for use in the radio frequency interference environment, and having a first end and a plurality of second ends, the first end of said fiber optic network being connected to the single optical input of the transmitter converter for inputting a composite light signal representative of all the light signals received from the plurality of second ends to the transmitter converter for conversion of the composite light signals to corresponding RF signals;*

*a plurality of receiver converters for converting RF signals into corresponding light signals, each receiver converter being connected to a respective second end of the fiber optic network for inputting the light signals into the fiber optic network;*

*a plurality of secondary receivers for receiving RF signals, each said secondary receiver being connected to a respective said receiver converter for inputting received RF signals thereto; and*

*an antenna associated with each said secondary receiver for receiving RF signals in the radio frequency interference environment, whereby the received RF signals are converted by the receiver converters to corresponding light signals and transferred through the fiber optic network, for conversion back to corresponding RF signals by the transmitter converter for transmitting by the primary transmitter.*

*10. A distributed antenna receiving system according to claim 9 wherein the plurality of receiver converters for converting RF signals into corresponding light signals includes a plurality of receiver amplifiers for receiving the RF signals and producing control signals, a plurality of lasers connected to the plurality of receiver amplifiers for receiving the control signals and outputting corresponding light signals into the fiber optic network, and the transmitter converter connected to the primary transmitter includes a photodetector connected to the fiber optic network for receiving the composite light signals and outputting corresponding RF signals for transmission by the primary transmitter to the remotely located radio frequency receiver.*

*11. A distributed transmitting and receiving antenna system for transmitting and receiving RF signals in a radio frequency interference environment, comprising:*

*a primary receiver for receiving RF signals from a remotely located transmitter;*

*a plurality of secondary transmitters for transmitting RF signals; and*

*a receiver/transmitter circuit interconnecting the primary receiver to the plurality of secondary transmitters, said receiver/transmitter circuit including: a first converter connected to the first primary receiver for receiving the RF signals and outputting corresponding light signals, a fiber optic network for use in the radio frequency interference environment, and having a first end connected to the first converter for receiving the light signals, and a plurality of second ends of the fiber optic network each for outputting all the light signals input to the first end thereof, a plurality of second converters connected respectively to the plurality of second ends of the fiber optic network for receiving the light signals and outputting corresponding RF signals to the first plurality of secondary transmitters, whereby all the secondary transmitters transmit RF signals corresponding to all the light signals input to the first end of the fiber optic network; and*

*a primary transmitter for transmitting RF signals to a remotely located receiver, a plurality of secondary receivers for receiving RF signals, and a transmitter/receiver circuit interconnecting the primary transmitter to the plurality of secondary receivers, said transmitter/receiver circuit including a plurality of third converters connected to the plurality of secondary receivers for receiving and converting RF signals to corresponding light signals, a fiber optic network having a plurality of first ends connected to the plurality of third converters for receiving the light signals, and a second end for outputting the light signals, and a fourth converter connected to the second end of the fiber optic network for receiving and converting the light signals to corresponding RF signals, said primary transmitter being connected to the fourth converter for receiving and*

*transmitting the RF signals to the remotely located receiver, wherein two-way RF signals are converted to corresponding light signals for transport by the fiber optic networks through a location exhibiting an RF interference environment and re-converted to RF signals for re-transmission, whereby two-way radio communication is provided in the location exhibiting the RF interference environment.*

*12. A distributed transmitting and receiving antenna system for transmitting and receiving RF signals in a radio interference environment, comprising:*

*a primary receiver/transmitter system for either receiving or transmitting RF signals, respectively, to or from a remotely located radio frequency transmitter/receiver system;*

*a plurality of secondary transmit and receive antennas for respectively transmitting and receiving RF signals; and*

*circuit means interconnecting the primary receiver/transmitter system to the plurality of secondary antennas, said circuit means including a first sub-circuit having a first means connected to the primary receiver/transmitter system for converting received RF signals into corresponding light signals, a fiber optic network having a first end connected to the first means for transporting all the light signals input to the first end to each end of a plurality of second ends of the fiber optic network, and a plurality of second means connected to the plurality of second ends for receiving and converting the light signals to RF signals for transmission by the plurality of secondary transmit antennas, whereby each said secondary transmit antenna transmits RF signals corresponding to all the light signals input to the first end of the fiber optic network; and*

*a second sub-circuit having a plurality of first means connected to the plurality of secondary receive antennas for receiving and converting RF signals to corresponding light signals, a fiber optic network having a plurality of ends connected to the plurality of first means of the first sub-circuit for transferring the light signals to an end opposite the plurality of ends, and a second means connected to the end opposite the plurality of ends of the fiber optic network for receiving and converting the light signals into RF signals for transmission by the primary receiver/transmitter system, wherein two-way RF signals are converted to light signals for transfer through a radio frequency interference environment and for conversion back to RF signals for transmission.*

*13. A method of receiving RF signals in a zone of interference and transmitting the RF signals at a remote location, comprising the steps of:*

*locating a plurality of RF receivers at spaced apart locations in the zone of interference for receiving free space transmissions of the RF signals;*

*converting the free space transmissions of RF signals to corresponding light signals;*

*transferring the light signals through a single optical medium from said zone of interference to a location remote from the zone of interference to a primary transmitter;*

*optically combining the light signals converted from RF signals received by each of the RF receivers to a composite light signal;*

*reconverting the composite light signals to corresponding RF signals; and*

*transmitting the RF signals by said primary transmitter so that the RF signals received within the zone of interference are transferred therefrom by the optical medium and retransmitted.*

*14. The method of claim 13 further including locating the spaced apart receivers in a vehicle traffic tunnel.*

*15. A method of transmitting RF signals within a zone of interference, as received from a remote location, comprising the steps of:*

*locating a plurality of RF transmitters at spaced apart locations within the zone of interference;*

*locating a primary RF receiver at said remote location for receiving RF signals;*

*converting the RF signals received at the remote location into corresponding light signals;*

*transferring all the light signals through a single optical medium from the remote location into the zone of interference to each said RF transmitter; and*

*converting all the light signals carried by the optical medium to corresponding RF signals for transmission of the RF signals by each said RF transmitter in free space in said zone of interference.*

*16. The method of claim 15 further including branching from the optical medium all the light signals for conversion thereof to the RF electrical signals and for transmission in free space of the RF signals.*

*17. The method of claim 15 further including locating the RF transmitters at spaced apart locations in a vehicle traffic tunnel.*

* * * * *